Feb. 3, 1959 W. G. HOELSCHER 2,871,993
CLAMPING MECHANISM FOR MACHINE TOOLS
Filed Jan. 10, 1956 2 Sheets-Sheet 2

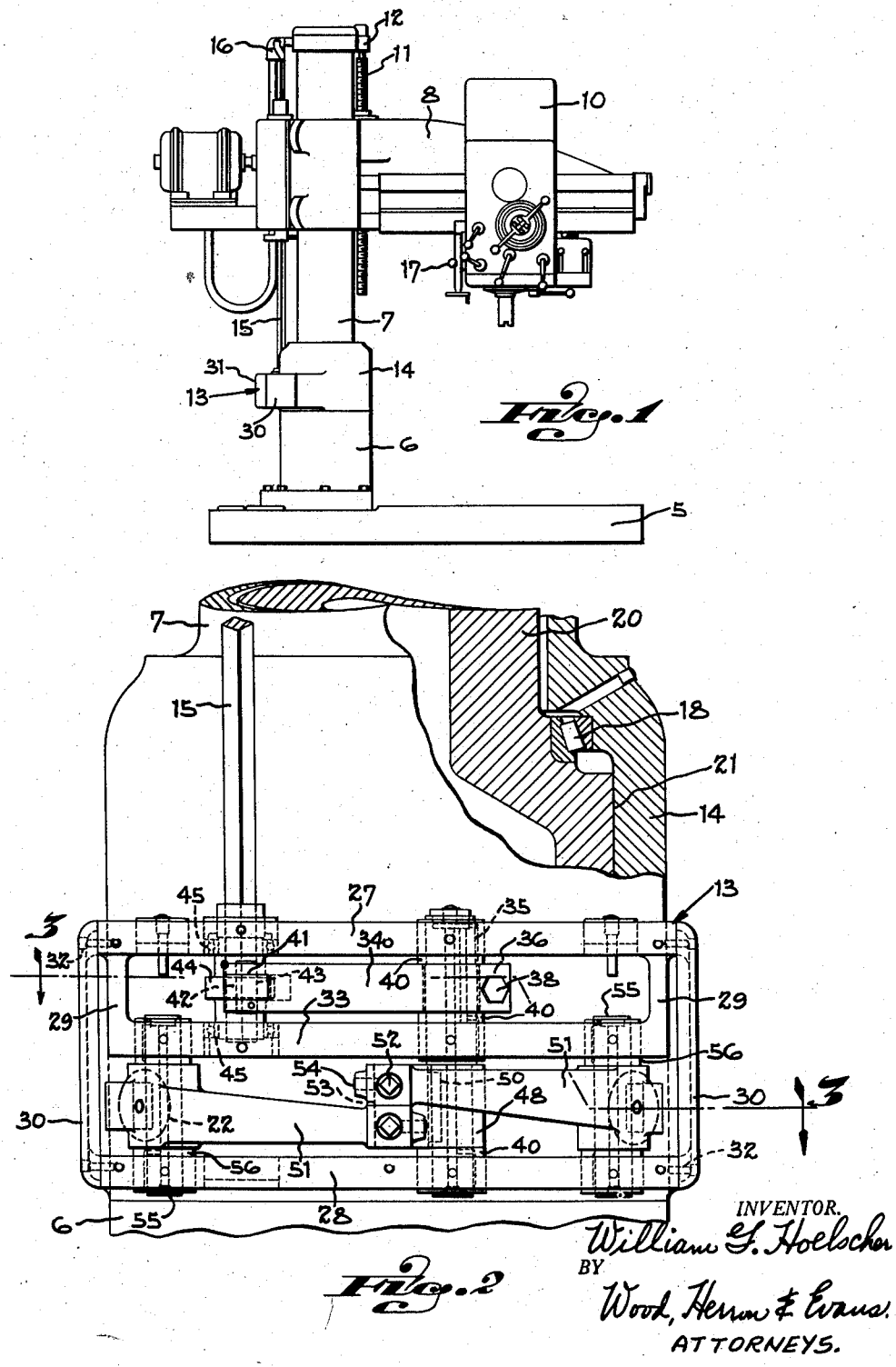

INVENTOR.
William G. Hoelscher,
BY
Wood, Herron & Evans,
ATTORNEYS.

United States Patent Office 2,871,993
Patented Feb. 3, 1959

2,871,993

CLAMPING MECHANISM FOR MACHINE TOOLS

William G. Hoelscher, Cincinnati, Ohio, assignor to The American Tool Works Company, Cincinnati, Ohio, a corporation of Ohio Application January 10, 1956, Serial No. 558,253

5 Claims. (Cl. 188—74)

This invention is directed to a clamping mechanism for machine tools generally, and in particular, for clamping the rotatable column of a radial drill to its base so as to lock the over-hanging arm and drill head securely in a selected radial position.

The radial drill which is selected to illustrate the principle of the invention includes a base upon which the work is clamped, a vertical column journalled on a stump which is mounted upon the base, and an arm keyed to the column and movable vertically along the column. The drill head is slidably carried upon the over-hanging arm and is thus shifted with the arm radially above the base. The present clamping mechanism is mounted in the lower portion of the column and locks the column to the stump in the selected radial positions.

In operating the conventional clamping mechanism of a radial drill, the clamping action tends to generate turning forces which act upon the column and displace the arm radially from its adjusted position, thus inching the tool from its alignment with the hole center of the work. A clamping mechanism designed to eliminate this tendency is disclosed in my prior patent, No. 2,682,933, which issued on July 6, 1954. This patent discloses a pair of wedging shoes carried in the lower portion of the column and slidable along an axis substantially tangent to the circumference of the stump. Upon being clamped, inner ends of the shoes move simultaneously toward one another and adjacent the stump so that any turning force generated by one shoe is opposed by an equal but opposed force generated by the other shoe. This neutralizes any tendency to impart rotary motion to the column as an incident to the clamping action.

A primary object of the present invention has been to eliminate the tendency to impart rotary force to the column by applying the clamping pressure against diametrically opposite sides of the stump along lines passing through the central axis of the column and stump. This principle completely eliminates the rotary component of force during the clamping action and locks the column rigidly in its selected position.

In its preferred embodiment, the present clamping mechanism utilizes two clamping shoes slidable in the lower portion of the column along an axis passing through the center of the stump and spaced 90 degrees apart radially about the circumference of the stump. Each clamping shoe has an opposed friction shoe mounted in the column along the axis of the clamping shoe but residing on the diametrically opposite side. The inner ends of the clamping shoes and friction shoes are presented to the circumference of the stump. The clamping shoes are forced inwardly in clamping engagement by respective clamping levers which are pivotally mounted in the column. Accordingly, each clamping shoe and its companion friction shoe hug the stump in clamping engagement from diametrically opposite sides, and since the clamping shoes and friction shoes are snugly fitted in the column, the stump and column are rigidly clamped together as a solid unit when clamping pressure is applied.

The clamping pressure is developed by a compound lever system similar to the structure shown in the aforesaid patent. In general, the leverage system includes a primary lever and a pair of secondary levers, all pivotally mounted within a clamp housing forming a part of the column. The primary lever is actuated by a cam and the secondary levers have their inner ends connected in common to the primary lever, their opposite ends being engaged against the clamping shoes so as to force the shoes into clamping engagement simultaneously as the cam is rotated.

In order to hold the arm against accidental displacement after the operator has adjusted it, but before the column is clamped, the present structure applies a slight constant turning resistance to the column. The constant resistance is also of advantage in drilling small holes and in other operations which do not require the column to be clamped rigidly. The drag resistance is created by the friction shoes which, for this purpose, are in the form of threaded plugs screwed into threaded bores in the column and adjusted to provide a light frictional engagement with the surface of the stump. The arrangement is such that the friction shoes apply the turning resistance constantly and independently of the clamping shoes when the mechanism is unclamped.

The opposed clamping shoes and friction shoes have the further advantage of isolating the clamping pressures from the anti-friction bearing which journals the column upon the stump. The clamping shoes and companion friction shoes preferably are adjusted to create an equal but opposed frictional engagement against opposite sides of the stump when unclamped, thus the structure and advantages of the invention are brought out in greater detail in the following description, taken in conjunction with the drawings which disclose a preferred embodiment of the invention. It will be understood from the disclosure that the invention is also intended to be applied to the arm clamp and to other machines having parts which require a rigid clamping action and elimination rotary forces incident to the clamping forces.

In the drawings:

Figure 1 is a side view of a typical radial drill incorporating the present clamping mechanism.

Figure 2 is an enlarged fragmentary front view of the lower portion of the column illustrating the compound lever system which actuates the clamping shoes.

Figure 3:
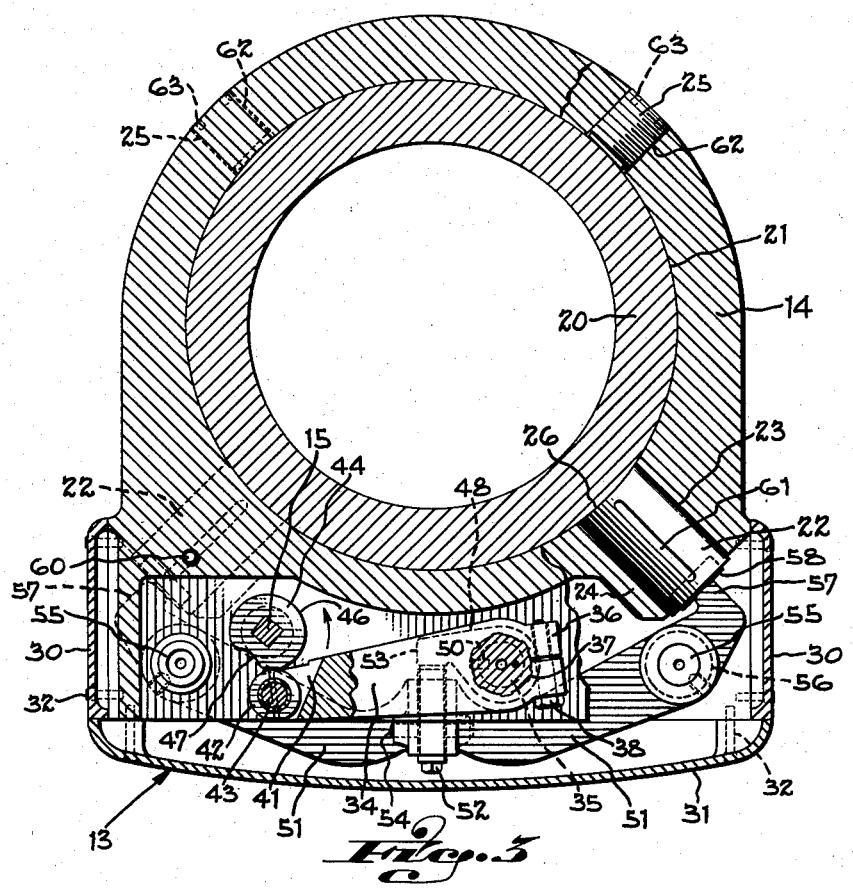
Figure 3 is a sectional view taken on line 3—3 of Figure 2 showing the lever system, clamping shoes and friction shoes in relation to the stump and column.

The radial drill shown in Figure 1 consists of a base 5 and a stationary stump 6 bolted to the base and rotatably mounting the vertical column 7 which carries the horizontal arm 8. The arm extends horizontally above the base and carries the drill head 10 for sliding movement along the arm relative to the base. The arm is adjusted vertically along the column by the elevating screw 11 which has its upper end suspended as at 12 from the top o fthe column. The arm includes a power driven nut (not shown) which is threaded on the elevating screw to raise or lower the arm; rotation of the nut may be controlled by a hand lever mounted on the arm (not shown).

The column is clamped to the stump by the clamping mechanism of this invention which is mounted within a clamp housing 13 forming a part of the hub 14 at the lower end of the column. The clamping mechanism is actuated by a vertical clamp shaft 15 extending parallel to the column with its lower end in operative connection with the clamping mechanism. The clamp shaft preferably is square in cross section to provide a slidable driving connection with its actuating mechanism in the vertically movable arm. The upper end of the clamp shaft is journalled in a bearing 16 attached to the upper end of the column. The actuating mechanism for rotating the clamp shaft 15 is not a part of the invention and is not disclosed. In the present example, a hand operated clamping lever 17 is mounted alongside the head and is coupled to the vertical shaft 15 for actuating the clamping mechanism manually; on the other hand, the lever may be connected to a suitable power device for rocking the clamp shaft by power.

Referring to Figure 2, the stump 6 includes a thrust bearing 18 journalling the column hub 14; the stump also includes an internal post 20 extending upwardly through the column, preferably including anti-friction bearings journalling the upper end of the column. The column is thus firmly supported and is freely rotatable upon the stump. The arm is slidably keyed to the column such that the arm may be swung radially with the column when the column clamp is disengaged; it is rigidly locked in its selected position when the clamp is engaged.

The interfitting surfaces of the hub and stump, as indicated at 21, are machined to provide a slight running clearance which allows the column to rotate freely upon its anti-friction bearings. As best shown in Figure 3, each clamping shoe 22 preferably is cylindrical and is slidably confined in a lateral bore 23 machined in the enlarged section 24 of the column hub. Each clamping shoe has a companion friction shoe 25 located diametrically opposite the clamping shoe. In the present example, the mechanism is provided with two sets of clamping shoes and opposed friction shoes, each clamping shoe and its friction shoe being located along a respective axis passing through the central axis of the stump and column and bisecting one another at 90 degrees. The inner ends of the clamping shoes, which are presented to the surface of the stump, have a curved face, as indicated at 26, which fits snugly against the cylindrical stump surface. As explained later in detail, the clamping shoes 22 and related friction shoes 25 are adjusted to engage the column from opposite sides under an equalized frictional preload so as to create a constant braking action when the mechanism is unclamped. This action allows the operator to swing the arm without excessive effort but provides drag to hold the arm in position before the column is clamped. When the clamping shoes are forced inwardly into clamping engagement, the clamping force acts in tension through the hub to the opposed friction shoes; therefore, the opposed sets of shoes grip the stump from diametrically opposite sides and do not tend to spring the column relative to the stump or cause over-loading of the bearing 18. It will be observed, that, since the axis of each clamping shoe and related friction shoe passes through the central axis of the stump and column, the clamping forces are applied directly against the column without developing any turning force.

The clamp housing 13 consists of upper and lower flanges 27 and 28 which are cast as an integral part of the column hub 14 and project outwardly in planes above and below the clamping shoes 22. The housing is enclosed by the side closure plates 30—30 and the front closure plate 31 which are secured by screws 32 threaded into the upper and lower flanges. An intermediate flange 33, also forming an integral part of the hub, is joined to the top flange 27 by the end webs 29.

A cam-actuated primary lever 34 is mounted between the top flange and intermediate flange and is keyed to a vertical stub shaft 35, the lever having a split end portion 36 clamped upon a splined portion 37 of shaft 35 by the screw 38. The stub shaft is journalled in bushings 40 located in the flanges of the housing. The swinging end of the primary lever is bifurcated as at 41 and includes a cam roller 42 journalled upon a stub shaft 43 secured in the lever. Roller 42 is tracked upon a cam 44 which is fitted upon the lower end of the square clamp shaft 15 so as to rock with the shaft. The lower portion of shaft 15 is carried in ball bearings 45 fitted into the upper and intermediate flanges. The cam has a concentric portion 46 which forms the clamping radius and a recessed portion 47 for release of the clamping pressure. In the position shown in Figure 3, the cam is in clamping position, the primary lever being forced outwardly. To release the clamp, the square shaft and cam are rotated in a counterclockwise direction, as indicated by the arrow in Figure 3, thus presenting the recessed cam portion to the roller.

The clamping pressure is transmitted from the primary lever 34 to an intermediate lever 48 located between the lower and intermediate flanges of the housing. The intermediate lever is keyed as at 50 to the stub shaft 35 of the primary lever and actuates the secondary clamping levers 51—51 in unison. For this purpose, the swinging end of each secondary clamping lever includes an adjustable set screw 52 having an inner end engaged against the swinging end 53 of the intermediate lever as shown in Figure 3. The set screws are locked in adjusted position by the lock screws 54. The individual set screws 52 allow each secondary clamping lever to be adjusted individually to create balanced clamping pressures and to compensate for wear which may occur after prolonged service.

The outer end of each secondary clamping lever 51 is journalled upon a fulcrum shaft 55 which is journalled in bushings 56 fitted into the housing flanges. A relatively short pressure arm 57 extends outwardly from each secondary clamping lever beyond its fulcrum shaft and engages a bearing disc 58 seated in the outer end of each clamping shoe to force the shoe inwardly. The clamping shoes preferably are fabricated from material which is softer than the stump to prevent scoring; the wear thus is concentrated upon the shoes which may be replaced if necessary after prolonged service.

As shown in Figure 3, lubricant is supplied to the clamping shoes by way of an external oil fitting (not shown). The fitting communicates with an oil passageway 60 leading to a longitudinal slot 61 formed in each clamping shoe to distribute oil.

The compound lever system provides one leverage increase from the primary lever 34 to the intermediate lever 48, and a second leverage increase from the intermediate lever 48 to the secondary clamping levers 51 which apply the clamping pressure to the shoes. Accordingly, a powerful clamping pressure is imposed upon the shoes without requiring a great deal of manual effort in shifting the manual control lever 17.

As best shown in Figure 3, each friction shoe is in the form of a threaded plug screwed into a threaded bore 62 formed in the hub 14 on an axis common to its companion clamping shoe. The exposed outer end of the friction shoes include spaced sockets 63 to be engaged by a wrench for adjusting purposes. The clamping shoes and related friction shoes are adjusted to apply an equalized pre-load pressure against opposite sides of the stump when unclamped, so as not to impose any radial pressure upon the anti-friction bearing 18. This is carried out by adjusting the set screws 52 of the secondary clamping levers and a related adjustment of the screw threaded friction shoes. Since the clamping shoes and friction shoes engage the stump when unclamped, a very slight forward motion of the clamping shoes is sufficient to create a rigid clamping engagement.

It will be evident that since the clamping shoes and friction shoes act along radial lines against the stump, there is no tendency to inch the column about its axis of rotation; moreover, the balanced clamping pressures imposed by the shoes neutralizes any tendency to spring the column relative to the stump. On the other hand, in unclamped condition, the column is free of the stump with the exception of the drag resistance which holds the column and arm temporarily in adjusted position.

Having described my invention, I claim:

1. In a machine tool having a cylindrical stump and column rotatably mounted relative to one another, a mechanism for clamping the column and stump in fixed position relative to one another comprising, a pair of clamping shoes slidably mounted within the column and displaced radially from one another about the circumference of the column, each of said shoes movable along a respective axis which passes substantially through the central axis of the column and stump, a respective opposed friction shoe mounted in said column along the respective axis of each clamping shoe, said clamping shoes having inner ends presented to the stump and said friction shoes having inner ends frictionally engaging the stump at points diametrically opposed to the clamping shoes, a clamp housing formed on the column adjacent the clamping shoes, a pair of clamping levers pivotally mounted within said housing, each of said levers having an outer end extending beyond its pivot point and engaged against the outer end of a respective clamping shoe, the inner ends of said levers being disposed adjacent one another, an actuating lever pivotally mounted within the housing, said lever being shiftable to a clamping or unclamping position and engaging the adjacent inner ends of the clamping levers and actuating the same in unison, respective screw means associated with said friction shoes and with said clamping shoes, said screw means coacting to adjust the friction shoes and clamping shoes relative to said stump and to maintain the shoes under equalized frictional engagement with said stump when the actuating lever is shifted to an unclamping position, thereby to impede rotary motion of the column relative to the stump, the said clamping levers forcing the clamping shoes into equalized pressure engagement against the cylindrical stump upon shifting of the actuating lever to a clamping position, the pressure imposed upon the stump by the clamping shoes reacting through the clamp housing and column and forcing the opposed friction shoes into pressure engagement against the stump, whereby the stump is gripped from diametrically opposite points without imposing relative clamping stress upon the stump and column.

2. In a machine tool having a cylindrical stump and a column rotatably journalled relative to one another, a mechanism for clamping the column and stump in fixed position relative to one another comprising, a hub on said column rotatably embracing the cylindrical stump, said hub having coaxial bores on opposite sides residing along an axis which passes substantially through the central axis of the column and stump, a cylindrical clamping shoe slidably mounted within one of said bores and having an inner end presented to the cylindrical stump, lever mounting means projecting outwardly from said hub adjacent said clamping shoe, a clamping lever pivoted in said mounting means and engaged against the outer end of said clamping shoe, actuating means connected to said lever, said lever forcing the shoe into clamping engagement along said axis upon operation of the said actuating means, said lever urging said clamping shoe under constant frictional engagement against the stump when said lever is in unclamped position, and a friction shoe mounted in the other of said coaxial bores on the opposite side of the hub, said friction shoe being in constant frictional engagement with the stump, the constant frictional engagement of the clamping shoe and friction shoe being equalized, said clamping shoe and friction shoe constantly impeding the turning movement of the column when the clamping mechanism is unclamped, said clamping lever reacting through the lever mounting means and hub when in clamping engagement and forcing the clamping shoe and friction shoe under equalized pressure engagement against the opposite sides of the cylindrical stump to clamp the column without imposing clamping stress relative to the column and stump.

3. In a machine tool having a relatively movable column and cylindrical support, a mechanism for clamping the column and support relative to one another comprising, a cylindrical hub on the column member loosely embracing the cylindrical support, a pair of clamping shoes slidably mounted in the column, said shoes movable along a respective axis which passes through the central axis of the column and having respective inner ends engageable with the cylindrical support, a respective friction shoe mounted in said column opposite each clamping shoe along the axis of the clamping shoe, each friction shoe having an inner end frictionally engaged against the cylindrical support, the said axes extending substantially at right angles to one another through said central axis of the column, said clamping shoes and friction shoes thereby being located at substantially equidistant points about the periphery of the column, said friction shoes providing a constant resistance impeding the movement of the column relative to the cylindrical support, respective clamping levers pivotally mounted upon the column and engaged against the outer ends of the clamping shoes, actuating means connected in common to the clamping levers, said actuating means shiftable to a clamping and unclamping position, and respective screw means associated with the friction shoes and clamping shoes, said screw means coacting to adjust said shoes reltaive to the cylindrical support and to maintain the friction shoes and clamping shoes under equalized frictional engagement with said cylindrical support when the actuating means is in unclamped position, thereby impeding rotary motion of the column relative to the cylindrical support, said actuating means and levers, upon being shifted to clamping position forcing the clamping shoes in unison into clamping engagement with the support, whereby the pressure imposed by the clamping levers upon the clamping shoes reacts through the column to the friction shoes causing the support to be gripped from opposite sides between the respective clamping shoes and friction shoes at said equi-distant points about the column without imposing relative clamping stress upon the column and support.

4. In a machine tool having a cylindrical stump and column rotatably journalled relative to one another, a mechanism for clamping the column in fixed position upon the stump comprising, a hub on said column rotatably embracing the cylindrical stump, said hub having coaxial bores on opposite sides residing along an axis which passes substantially through the central axis of the column and stump, a cylindrical clamping shoe slidably mounted within one of said bores and having an inner end presented to the cylindrical stump, a plurality of flanges projecting outwardly from said hub on opposite sides of said clamping shoe, a clamping lever pivotally mounted between said flanges and engaged against the outer end of said clamping shoe, actuating means connected to said lever, said lever forcing the shoe into clamping engagement along said axis upon operation of the said actuating means, and a friction shoe mounted in the other of said coaxial bores on the opposite side of the hub and engaging the stump, and means normally urging said clamping shoe and friction shoe under equalized frictional engagement with the periphery of the cylindrical stump when the clamping lever is in an unclamped position, said shoes thereby normally impeding rotary motion of the column relative to the stump, said clamping lever reacting in tension upon said flanges and through the hub when in clamping engagement with the clamping shoe, whereby the clamping shoe and friction shoe are forced into pressure engagement against the opposite sides of the cylindrical stump to clamp the column without imposing clamping stress relative to the column and stump.

5. In a machine tool having a movable column and a stationary cylindrical stump supporting the column, a mechanism for clamping the column to the stump comprising, a cylindrical hub on the column rotatably embracing the cylindrical stump, said hub having respective pairs of bores formed therein, each pair of bores being disposed on diametrically opposite sides of the hub along a respective common axis which passes through the central axis of the column, a clamping shoe and an opposed friction shoe mounted in each pair of opposed bores along the common axis thereof, said axes extending substantially at right angles to one another, whereby said clamping shoes and friction shoes are located at substantially equi-distant points about the hub of the column, a pair of flanges projecting outwardly from the hub on opposite sides of the clamping shoes, a pair of clamping levers pivoted between said flanges and engaged against the outer ends of the clamping shoes, actuating means connected in common to said levers for forcing said shoes in unison into clamping engagement with the cylindrical stump, adjustment means interposed between the friction shoes and said stump, said adjustment means providing controlled frictional engagement of the friction shoes against the stump, and adjustment means interposed between the said actuating means and clamping levers, said adjustment means providing controlled engagement of the clamping shoes against the stump when the clamping shoes are unclamped, whereby said clamping shoes and friction shoes create a constant resistance to movement of the column, said clamping levers, when in clamping position, reacting through the hub, whereby the clamping shoes and related friction shoes grip the stump from diametrically opposite sides along said axis without imposing relative clamping stress upon the stump and column.

References Cited in the file of this patent
UNITED STATES PATENTS

| | | |
|---|---|---|
| 2,375,169 | Linden et al. | May 1, 1945 |
| 2,682,933 | Hoelscher | July 6, 1954 |
| 2,749,617 | Gruettner | June 12, 1956 |
| 2,762,243 | Knosp et al. | Sept. 11, 1956 |

FOREIGN PATENTS

| | | |
|---|---|---|
| 192,655 | Great Britain | May 6, 1922 |